United States Patent [19]

Rocholl et al.

[11] 4,004,659
[45] Jan. 25, 1977

[54] CLOSURE FOR BRAKE JAW HOLDER FOR DISC BRAKES

[75] Inventors: Hans Rocholl; Willi Klein, both of Remscheid, Germany

[73] Assignee: Bergische Stahl-Industrie, Remscheid, Germany

[22] Filed: July 10, 1975

[21] Appl. No.: 594,709

[30] Foreign Application Priority Data

July 15, 1974 Germany .......................... 2434004

[52] U.S. Cl. .......................... 188/244; 188/250 G
[51] Int. Cl.² ................................. F16D 65/04
[58] Field of Search ............. 188/73.6, 234, 242, 188/244, 245, 250 G, 250 B, 250 R; 192/70.13

[56] References Cited

UNITED STATES PATENTS

| 2,451,326 | 10/1948 | Eksergian et al. | 188/234 |
| 2,711,801 | 6/1955 | Super et al. | 188/242 |
| 3,851,738 | 12/1974 | Gebhardt et al. | 188/244 |

FOREIGN PATENTS OR APPLICATIONS 1,579,188   7/1969   France .............................. 188/244

*Primary Examiner*—George E. A. Halvosa
*Attorney, Agent, or Firm*—Walter Becker

[57] ABSTRACT

A closure for a brake jaw holder for disc brakes, especially for use in connection with rail vehicles, in which a closure latch extends in a direction transverse to the guiding direction of the brake lining and in which the lining in a closing manner extends from the rear side of the lining carrier into an opening provided therein. At both sides of the opening in the closure latch there is provided an oblong opening extending perpendicularly with regard to the surface of the lining carrier while the pertaining bolt or pin is arranged on the lining carrier. Elastic spring structure is provided for arresting the closure latch when the bolt or pin occupies either one of its end positions in the oblong opening.

7 Claims, 4 Drawing Figures

CLOSURE FOR BRAKE JAW HOLDER FOR DISC BRAKES

The present invention relates to a closure for a brake jaw holder for disc brakes, especially for rail vehicles, in which a closure latch extends transverse to the guiding means for the lining, and in which the guiding means for the lining extends in a closing manner from the back side of the carrier for the lining into an opening provided therein.

A closure for a brake jaw holder has become known according to which the closure latch is pivotable about an axis which extends in the longitudinal direction of the guiding means for the lining and, more specifically, is pivotable in a direction perpendicular to the plane for the carrier for the lining. This closure latch has a locking nose which in closed position of the closure latch closes the guiding means for the lining.

The drawback of such closure is above all seen in the fact that for the opening, i.e. for purposes of pivoting the closure, a relatively larger space is required on the back side of the carrier for the lining, which space generally is not available because the carrier for the lining has its back side provided with eyes in which the bolt for the suspension plate is provided. A brake jaw of such design, therefore, can be employed only in special instances. In addition thereto, the swivel joint for the closure latch can relatively easily wear or can be damaged by corroding influences and may even be made useless thereby. Therefore, it has been suggested to arrange closure latches in grooves which extend transverse to the guiding means for the lining and are located in front of said guiding means for the lining. These last mentioned closure latches have to be displaced in their longitudinal direction for purposes of opening them. The said closure latches, however, have the drawback that when handled roughly during the exchange of brake linings, they may get lost.

It is, therefore, an object of the present invention to provide a closure for a brake jaw holder which requires considerably less working space than is necessary with a pivotal closure, and which is attached to the brake jaw carrier so that it cannot be lost.

These and other objects and advantages of the invention will appear more clearly from the following specification in connection with the accompanying drawings, in which.

The closure for the brake jaw holder according to the present invention in which a closure latch is located transverse to the guiding means, and in which the guiding means for the lining extends in a closing manner from the back side of the carrier for the lining into an opening therein is characterized primarily in that there is provided an oblong hole located perpendicularly with regard to the carrier surface for the lining and arranged at both sides of the opening in the closure latch, while the pertaining bolt, etc., is arranged on the carrier for the lining, or vice versa while elastic means known per se are provided for arresting the closure latch when the bolt, pin or the like occupies one or the other end position in said oblong hole.

Advantageously, the closure latch is on both sides guided between two eyes on the lining carrier.

Figure 1:
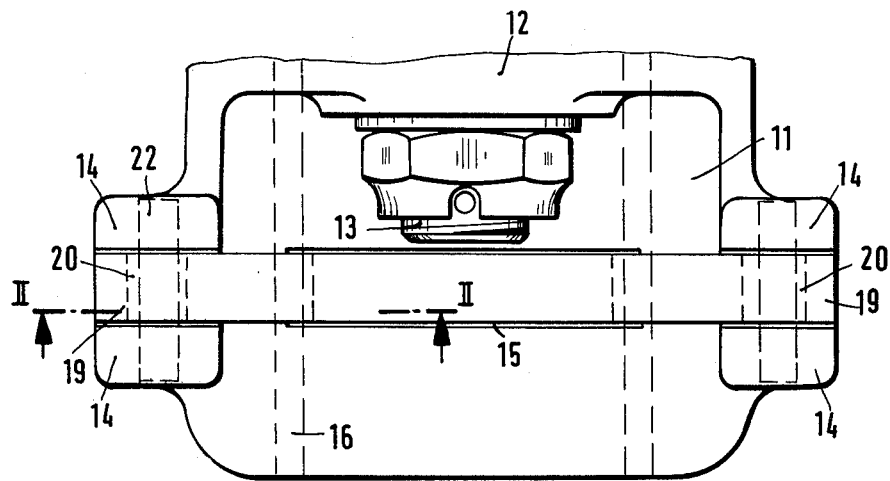
FIG. 1 is a rear view of the lining carrier with closure means.
Figure 2:
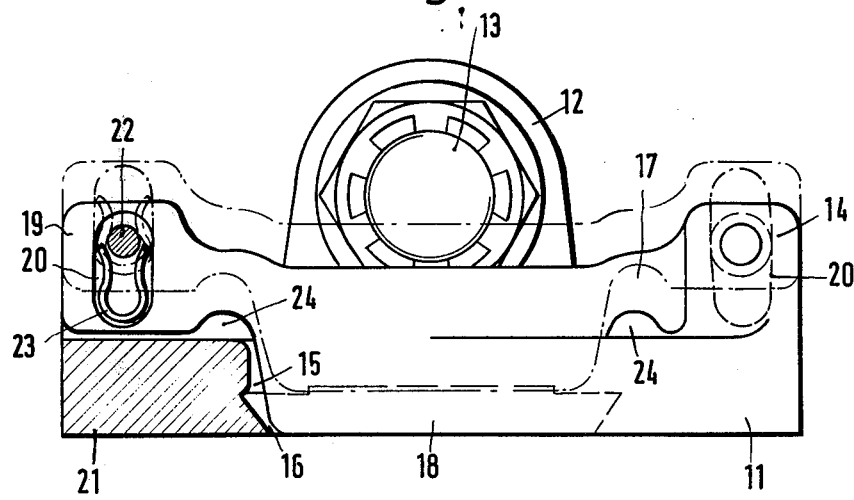
FIG. 2 represents a section taken along the line II—II of FIG. 1.

Referring now to the drawings in detail, according to FIGS. 1 and 2, the brake lining carrier 11 has its back side provided with eyes 12 in which the suspension bolt 13 is arranged. Furthermore, there are four other eyes 14 provided on both sides of an opening 15. The opening 15 has approximately the width of the dovetail guiding means 16 on the front side of the brake lining carrier 11. The closure latch 17 extends with its part 18 into the opening 15 and with its nose or two side portions 19 extends between the eyes 14. In the lateral part 19 of the latch 17 is on both sides of opening 15 provided an oblong hole 20 the longitudinal axis of which extends perpendicularly with regard to the surface 21 of the lining carrier. Provided in this oblong hole 20 is a pin 22 which is secured in the two eyes 14. Furthermore, in said oblong hole there is also provided a leaf spring 23 which is approximately U-shape bent and which has curved legs.

FIG. 2 shows in full lines the closing position of latch 17. The bolt 22 is in one end position of the oblong hole 20 held by the spring 23 whereas in its open position the latch occupies the position shown by dash lines. In this connection, the bolt 22 occupies the other end position of the oblong hole 20 and here is likewise held stationary by the spring 23. The spring 23 may also occupy such a position that it extends from the top to the bottom in the oblong bore 20 a position opposite to that shown in FIG. 2.

In both instances, the spring 23 performs the same function namely to arrest the closure latch 17 in opened or closed position so that the closure latch will then be held stationary in the respective position. Inasmuch as two springs 23 are provided on each closure latch, the safety against breakage is extremely high because even then the dovetail guiding means 16 is closed when the closure latch on one side occupies its opening position in view of a broken spring 23. Expediently, on the closure latch on both sides of the opening 15 there is provided a recess 24 so that a fork-shaped instrument can engage the two recesses 24 and the closure can be opened. This brings about a considerable simplification so that the replacement of the brake linings can be effected in a considerably simpler way and in a considerably shorter time.

Figure 3:
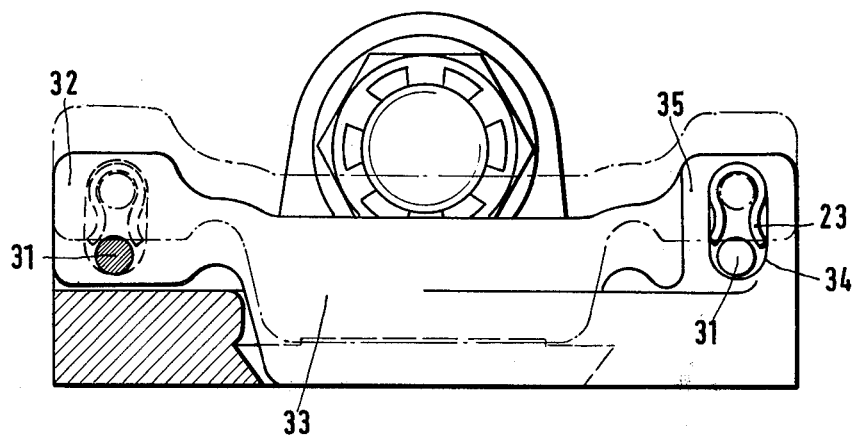
FIG. 3 illustrates another arrangement of the oblong hole and the pertaining bolt.
Figure 4:
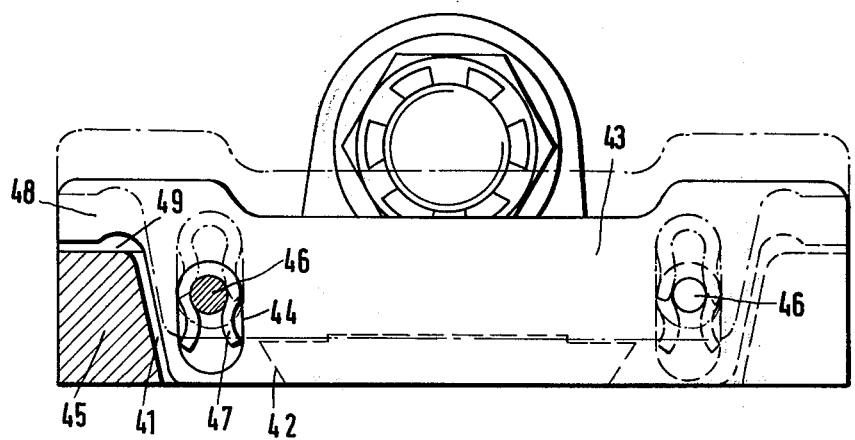
FIG. 4 represents a modified closure latch.

FIG. 3 shows an embodiment of the closure for the brake jaw holder, according to which the bolt 31 is fixedly arranged in each lateral part 32 of the latch 33 and is located in oblong holes 34 which are arranged in the eyes 35 on both sides of the closure latch. The bolt 31 extends on both sides of the closure latch 33 into one eye 35 each. In each oblong hole 34 there is arranged a spring 23 so that with this embodiment the safety against accidental opening by breakage of the springs 23 is still further considerably increased because now there are provided four springs 23 per closure latch. Of these springs one could break in each pair of eyes 35 while still complete safety would exist against accidental opening. A further advantageous embodiment of the invention is illustrated in FIG. 4 according to which the opening 41 is considerably wider than the dovetailed guiding means 42, and the closure latch 43 is with its entire width located in the opening 41. Within the opening 41 on both sides of the dovetailed guiding means 42 there is respectively located one oblong hole 44 in the closure latch while in this oblong hole there is located a pin arranged in the carrier for the brake lining 45 while additionally U-shaped bent springs with curved legs are arranged in the oblong holes. At both sides, the closure latch has noses 48 which serve as abutment and below which flutes, grooves or fillets 49 are provided which can be engaged by a fork-shaped instrument in order to open the closure. When occupying its open position, the closure latch 43 will then occupy the position shown in dash lines. This embodiment shows an optimum of space exploitation and of safety as well as simplicity in manufacture because in this instance the carrier 45 for the brake lining can on one side of opening 41 be cut off and then by means of two screws a wall can be screwed on in front of the opening 41.

Also with this last mentioned design, an exchange of oblong hole and pertaining pin or bolt can be effected by arranging the pin 46 rigidly in the latch 43 and providing the pertaining oblong holes in the carrier for the brake lining. According to another modification of the present invention, other spring elements, for instance of rubber, may be employed which act in such a way that the pin or the bolt in one or its other end position will be arrestable in the oblong hole. This is necessary under all circumstances in order to make sure that the closure remains closed.

Instead of providing the eyes on the back side of the carrier for the brake lining, also lateral cuts may be provided in which the oblong hole or the pertaining bolts is provided while the latch on both sides comprises an extension extending into said cut, in which extension the other element namely the oblong hole or pin is provided.

According to another embodiment of the invention, the pin or bolt itself is elastic and the oblong hole is provided with curved lateral surfaces so that the bolt or pin can engage in said oblong hole in one or the other end position. According to still another embodiment of the invention, the bolt itself may not be elastic but in this instance carries elastic elements for instance a spring urged ball which can engage corresponding depressions in the oblong hole so that also in this instance the bolt is arrested in one or the other end position in the oblong hole.

The side walls of the opening 41 may according to FIG. 4 act and be designed as side walls of an oblong hole in which instance the power elements, for instance a spring urged ball may be pressed against these side walls of opening 41 where they can engage corresponding depressions so that as a result thereof the opened or closed position of the closure latch 43 is determined. In this instance, however, an abutment has to be provided which limits the movement of the latch in its open position so that when opening the latch, the latch cannot be pulled out of the opening 41. This can be established in a very simple manner with standard means, however. As will be evident from the above, the advantage of this design is seen primarily in the fact that the closure latch will also in opened condition require little space while nevertheless the closing function fully remains without the necessity of providing space for the pivoting of the latch or without the necessity of providing complicated and expensive constructions.

Also, the establishment of a closure or the opening in the carrier for the brake lining can be carried out with simple means while, if necessary, the carrier for the lining can be divided within the region of the opening which permits a particularly simple manufacture of said opening.

It is, of course, to be understood, that the present invention is, by no means, limited to the specific showing in the drawings, but also comprises any modifications within the scope of the appended claims.

What we claim is:

1. A closure for a brake jaw holder for disc brakes, which includes in combination: a first member forming a brake lining carrier having a rear side and provided with a lining carrying surface and having an opening, guiding means associated with said carrier for guiding a brake lining, a second member forming a closure latch movable from the rear side of said brake lining carrier into said opening for closing the same, said closure latch extending in a direction transverse to the direction of said guiding means, said second member at both sides of said opening being provided with oblong opening means having the longitudinal axis thereof extending substantially perpendicularly with regard to said lining carrying surface, elastic arresting means arranged in said second member, pin means fixedly arranged in said first member, said closure latch being movable from a first end position representing its maximum open position to a second end position representing its maximum closed position and vice versa, and said elastic arresting means being operable to arrest said closure latch in either one of said end positions.

2. A closure in combination according to claim 1, in which that portion of said closure latch which is located in said opening extends at least over the entire width of said guiding means for the brake lining.

3. A closure in combination according to claim 2, in which said brake lining carrier has on opposite sides thereof a pair of eyes arranged in spaced relationship to each other and having their axes substantially perpendicular to the direction of movement of said closure latch, said closure latch being guided between the eyes of said pair of eyes.

4. A closure in combination according to claim 3, in which said pin means are secured in said eyes.

5. A closure in combination according to claim 4, in which said elastic arresting means include U-shaped leaf spring means having curved legs and arranged in said oblong opening means.

6. A closure in combination according to claim 1, which includes abutment means being provided for limiting movement of said closure latch beyond said maximum open end position to thereby prevent said closure latch from accidentally being pulled out of said opening.

7. A closure in combination according to claim 6, in which both sides of said closure latch are provided with noses forming said abutment means and have recess means adapted to be engaged by an instrument for actuating said closure latch.

* * * * *